United States Patent [19]
Reischl et al.

[11] 4,092,275
[45] May 30, 1978

[54] POLYURETHANE RESINS PREPARED FROM ACTIVE HYDROGEN CONTAINING MATERIAL WHICH IS A DISPERSION OF POLYISOCYANATE-POLYADDITION PRODUCTS IN HYDROXYL CONTAINING COMPOUNDS AS DISPERSING AGENTS

[75] Inventors: Artur Reischl, Leverkusen; Gert Jabs; Werner Dietrich, both of Cologne; Alberto Carlos Gonzalez-Dórner, Leverkusen, all of Germany

[73] Assignee: Bayer Aktiengesellschaft, Leverkusen, Germany

[21] Appl. No.: 740,455

[22] Filed: Nov. 10, 1976

[30] Foreign Application Priority Data

Nov. 12, 1975 Germany ............................. 2550860

[51] Int. Cl.² ............................................. C08G 18/14
[52] U.S. Cl. ........................ 260/2.5 BD; 260/2.5 AM; 260/2.5 BE; 260/29.2 TN; 260/77.5 AA
[58] Field of Search ............... 260/33.4 UR, 29.2 TN, 260/2.5 AM, 77.5 AA, 2.5 BD, 2.5 BE

[56] References Cited

U.S. PATENT DOCUMENTS

| | | | |
|---|---|---|---|
| 3,178,310 | 4/1965 | Berger et al. | 260/29.2 TN |
| 3,360,495 | 12/1967 | Muller et al. | 260/30.6 R |
| 4,016,121 | 4/1977 | Matsuda et al. | 260/29.2 TN |

FOREIGN PATENT DOCUMENTS 1,044,267  9/1966  United Kingdom ........ 260/29.2 TN

*Primary Examiner*—M. J. Welsh
*Attorney, Agent, or Firm*—Gene Harsh; Joseph C. Gil; William E. Parry

[57] ABSTRACT

The instant invention relates to the use of stable, relatively low viscosity dispersions of polyisocyanate-polyaddition products in hydroxyl containing compounds as dispersing agents in the preparation of polyurethane resins. The dispersions are made by a process which broadly comprises mixing an aqueous dispersion of an isocyanate-polyaddition product with a compound having at least two hydroxyl groups and having a boiling point about 100° C, and thereafter at least partially distilling off the water.

5 Claims, No Drawings

POLYURETHANE RESINS PREPARED FROM ACTIVE HYDROGEN CONTAINING MATERIAL WHICH IS A DISPERSION OF POLYISOCYANATE-POLYADDITION PRODUCTS IN HYDROXYL CONTAINING COMPOUNDS AS DISPERSING AGENTS

BACKGROUND OF THE INVENTION

Numerous processes have become known for the preparation of polyurethane dispersions in water. Summarizing reports have been given, for example, by D. Dieterich and H. Reiff in "Die Angewandte Makromolekulare Chemie" 26, 1972 (pages 85–106); D. Dieterich et al in Angewandte Chemie, 82, 1970 (pages 53–63) and D. Dieterich et al in J. Oil Col. Chem. Assoc. 53, 1970 (pages 363–379). These reports also give a comprehensive survey of the literature. The process which is generally preferred for the preparation of aqueous polyurethane dispersions comprises reacting an isocyanate prepolymer dissolved in an organic solvent with a chain lengthening agent. Either the prepolymer used for this process or the chain lengthening agent contains ionic groups or groups which are capable of forming ions and which are subsequently converted into ionic groups or which are converted into ionic groups in the course of the polyaddition reaction.

The aqueous dispersion is formed at the same time or subsequently by the addition of water and removal of the organic solvent by distillation. It is apparent that the solvent used in this procedure must have a lower boiling point than water.

Polyurethane resins having a specific structure cannot generally be synthesized in organic solvents or dispersing agents which contain hydroxyl groups because the polyaddition reaction which takes place under those conditions is a non-specific one, i.e., the hydroxyl-containing solvent or dispersing agent is liable to take part in the reaction as well.

Particular diisocyanate polyaddition products directly prepared in polyethers or polyesters as dispersing agents are, however, known. Thus, according to German Auslegeschrift 1,168,075 U.S. Pat. No. 3,360,495, isocyanates are reacted with difunctional primary alcohols in a polyether or polyester (molecular weight 500 to 3,000) as the dispersing medium, the polyether or polyester used being one which contains at least two secondary hydroxyl groups in the molecule. According to German Auslegeschrift 1,260,142 U.S. Pat. No. 3,325,421, compounds containing isocyanate and amino groups are made to undergo a polyaddition reaction in situ in a polypropylene glycol ether used as the dispersing agent. However, since, as already explained above, a certain amount of dispersing agent (depending on the reaction conditions) also takes part in the reaction, the products obtained in the processes according to German Auslegeschriften Nos. 1,168,075 and 1,260,142 are highly viscous dispersions which may be used as thickeners for textiles or dyeing processes. Preparation of the dispersions is, moreover, restricted to those products in which the dispersing agent and the chain lengthening agent used for the polyaddition reaction differ markedly from each other in their reactivity with isocyanates.

A 20% polyhydrazodicarbonamide dispersion in a polypropylene glycol ether prepared according to German Auslegeschrift No. 1,260,142 already has a viscosity of over 200,000 cP at 25° C. This amounts to more than 200 times the viscosity of pure dispersing agent. When attempts are made to prepare a 40% dispersion, the reaction mixture generally solidifies before the polyaddition has been completed. The high viscosities which occur already at relatively low solid concentrations severely restrict the possibilities of using the products of the process since in many fields of application they cannot be dosed with the aid of the usual dosing apparatus. For producing polyurethane foams, for example, for which purpose such dispersions could be suitable, the viscosities of the starting materials must be below 2500 cP if conventional high pressure machines are to be employed.

According to another earlier proposal, relatively low viscosity dispersions of polyureas and/or polyhydrazodicarbonamides in polyethers having hydroxyl groups can be obtained if the polyaddition reaction is carried out continuously in continuous flow mixers. The process has the disadvantage of requiring a relatively complicated technique of dosing and mixing which is uneconomical for usual production rates. Moreover, in some cases high solid concentrations may give rise to considerable difficulties in the removal of the heat of reaction. It is clear that only special types of dispersion can be produced by this process, for the reason explained above. Polyisocyanate polyaddition products having a defined structure also cannot be produced by this process since the possibility of the hydroxyl containing dispersing agents taking part in the reaction cannot be excluded.

DESCRIPTION OF THE INVENTION

The present invention relates to the use of certain dispersions, described below, as starting components for the production of polyurethane resins and, in particular, of polyurethane foams.

The dispersions may be reacted with polyisocyanates and, optionally, chain lengthening agents and other additives in a known manner to produce high molecular weight polyadducts. Modified polyurethane resins having improved chemical and physical properties are thereby obtained.

It has now been found that stable dispersions of cationic, anionic or non-ionic polyisocyanate polyaddition products having a clearly defined composition in compounds containing hydroxyl groups can be prepared quite simply if one starts with fully prepared aqueous polyurethane (urea) dispersions, adds a compound which contains hydroxyl groups and has a boiling point above 100° C and subsequently distills off the water either completely or only partially. These products can be obtained by a process which comprises mixing an aqueous dispersion of an isocyanate-polyaddition product with a compound having at least two hydroxyl groups and having a boiling point above 100° C, and thereafter at least partially distilling off the water.

Apart from the fact that it could not be predicted that stable or even sedimenting and redispersible aqueous dispersions of polyisocyanate polyaddition products could be converted into stable dispersions if the water used as dispersing agent was replaced by a compound containing hydroxyl groups, it is particularly surprising for the following reason that finely divided, relatively low viscosity dispersions can be prepared:

(a) A water content of 10%, 15% or 20% by weight (based on the total quantity of polyhydroxyl compound and water) increases the viscosity, e.g. of a polyalkylene ether glycol at 25° C to 4, 8 and 50 times, respectively, the original value (3500, 7300 and above 50,000 cP).

(b) Any further increase in the water content in many cases causes the solution or emulsion originally formed to separate into its phases. Both the high increase in viscosity and the separation into its components would, therefore, inevitably lead the routineer to assume that the introduction of water into dispersing agents containing hydroxyl groups would be unsuitable for the preparation of stable, low viscosity dispersions of polyisocyanate-polyaddition products. When attempts are made according to U.S. Pat. No. 3,869,413 to apply the process according to the invention to conventional polymer latices (rubber latices, PVC latex, acrylate dispersions, etc.), it is frequently found that the polymer is converted into a paste as soon as higher molecular weight polyols are added or it precipitates when water is distilled off (even if reduced pressure is employed).

The stable, relatively low viscosity dispersions of polyisocyanate polyaddition products in hydroxyl containing compounds as dispersing agents are prepared by a process which is characterized in that a previously prepared aqueous dispersion of a polyisocyanate polyaddition product, preferably a polyurethane, polyurea or polyhydrazodicarbonamide, is mixed with a compound which contains at least two hydroxyl groups and which has a boiling point above 100° C, and the water is subsequently at least partially removed by distillation.

The dispersing agents, i.e. the external, continuous phase of the dispersion, which are preferred are the high molecular weight and/or low molecular weight polyols known per se as reaction components in polyurethane chemistry, which contain from 2 to 8, preferably from 2 to 6 and most preferably from 2 to 4 primary and/or secondary hydroxyl groups. Their molecular weight is generally between 62 and 16,000, preferably between 62 and 12,000, and most preferably between 106 and 8000.

These include, for example, both low molecular weight glycols or polyols having a molecular weight of between 62 and about 400 which may also contain ether, thioether or ester bonds and polyester, polyethers, polythioethers, polyacetals, polycarbonates and polyester amides having molecular weights of more than 400, such as those known per se for the production of polyurethanes.

Suitable low molecular weight dispersing agents (optionally used only as part of a mixture) include the diols and triols conventionally used as chain lengthening or cross-linking agents in polyurethane chemistry, e.g. propylene glycol-(1,2) and -(1,3), butylene glycol-(1,4) and -(2,3), hexanediol-(1,6), octanediol-(1,8), neopentyl glycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4) or trimethylolethane, and the like. Glycols which have a hydrophilic character are particularly preferred and include ethylene glycol, diethylene glycol, triethylene glycol, tetraethylene glycol and polyethylene glycols having a molecular weight of up to 400. In addition, however, compounds such as dipropylene glycol, polypropylene glycols having molecular weights up to 400, dibutylene glycol, polybutylene glycols having molecular weights up to 400, thiodiglycol and castor oil may also be used as dispersing agents according to the invention. The following may also be used: Ester diols of the general formulae

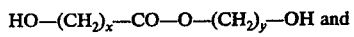

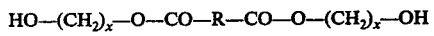

in which R represents an alkylene or arylene group having from 1 to 10 and preferably 2 to 6 carbon atoms, x = 2 to 6 and y = 3 to 6.

Specific examples include δ-hydroxybutyl-ε-hydroxycaproic acid ester, ω-hydroxy-hexyl-γ-hydroxybutyric acid ester, adipic acid-bis-(β-hydroxyethyl) ester and terephthalic acid-bis-(β-hydroxyethyl)-ester. Also suitable are diolurethanes of the general formula

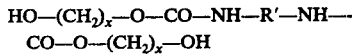

in which

R' represents an alkylene, cycloalkylene or arylene group having from 2 to 15, preferably 2 to 6 carbon atoms and x represents an integer of from 2 to 6. Specific examples include 1,6-hexamethylene-bis-(β-hydroxyethylurethane) and 4,4'-diphenylmethane-bis-(δ-hydroxybutylurethane).

Also suitable are diol ureas of the general formula

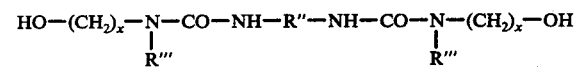

in which

R" represents an alkylene, cycloalkylene or arylene group having from 2 to 15 and preferably 2 to 9 carbon atoms, R''' = hydrogen or a methyl group and x = 2 or 3.

Specific examples are 4,4'-diphenylmethane-bis-(β-hydroxyethylurea) and the compound

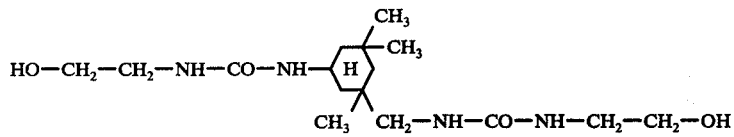

Particularly suitable among the dihydric and trihydric low molecular weight alcohols are those which, either alone or as mixtures or with the addition of higher molecular weight alcohols, are liquid at temperatures below 50° C.

It has been found that in some cases when low molecular weight dispersing agents and where substantially linear polyisocyanate addition compounds are used, solutions rather than dispersions are formed. In this context, "solution" means a clear, uniform and homogeneous mixture of polyaddition product and dispersing agent. Such solutions are not intended to be covered by the term "dispersion" as used throughout the specification. It has been found, however, that formation of a solution can be easily avoided by the presence of small amounts of water in the dispersing agent. Generally an amount of water of about 1% by weight, based on the total weight of the dispersion is sufficient to avoid the formation of a solution. However, as set forth below, the amount of water in the dispersions may be varied within wide limits depending on the particular system involved and the intended use. In most cases, however, the dispersions may be made completely water-free without being undesirably converted into solutions.

Higher molecular weight hydroxyl polyesters which are suitable as dispersing agents include e.g. reaction products of polyhydric, preferably dihydric, alcohols to which trihydric alcohols, and polybasic, preferably dibasic carboxylic acids may be added. Instead of free polycarboxylic acids, the corresponding polycarboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalate and bis-glycolterephthalate. Suitable polyhydric alcohols include, e.g. ethylene glycol, propylene glycol-(1,2) and -(1,3), butylene glycol-(1,4) and -(2,3), hexanediol-(1,6), octane-diol-(1,8), neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, e.g. $\epsilon$-caprolactam, or hydroxycarboxylic acids, e.g. $\omega$-hydroxycaproic acid, may also be used.

The higher molecular weight polyethers preferably used as dispersing agents according to the invention are obtained in known manner by reaction of the starting compounds which contain reactive hydrogen atoms with alkylene oxides such as ethylene oxide, propylene oxide, butylene oxide, styrene oxide, tetrahydrofuran or epichlorohydrin or with any mixtures of these alkylene oxides. In many cases, it is preferred to use polyethers which contain predominant amounts of primary hydroxyl groups. Suitable starting compounds containing reactive hydrogen atoms include e.g. water, methanol, ethanol, ethylene glycol, propylene glycol-(1,2) or -(1,3), butylene glycol-(1,4) or -(2,3), hexanediol-(1,6), octanediol-(1,8), neopentyl glycol, 1,4-bis-hydroxymethylcyclohexane, 2-methyl-1,3-propane-diol, glycerol, trimethylolpropane, hexanetriol-(1,2,6), butanetriol-(1,2,4), trimethylolethane, pentaerythritol, mannitol, sorbitol, methyl glycoside, sucrose, phenol, isononylphenol, resorcinol, hydroquinone, 1,2,2- or 1,1,3-tris-(hydroxyphenyl)-ethane, ammonia, methylamine, ethylene diamine, tetra- or hexamethylene diamine, diethylene triamine, ethanolamine, diethanolamine, triethanolamine, aniline, phenylenediamine, 2,4- and 2,6- diaminotoluene and polyphenyl-polymethylene polyamines of the kind obtained by anilineformaldehyde condensation. Resinous materials such as phenol and resol resins may also be used as starting materials.

Polyethers modified by vinyl polymers are also suitable for the process according to the invention. Products of this kind may be obtained by polymerizing e.g. styrene and acrylonitrile in the presence of polyethers (U.S. Pat. Nos. 3,383,351; 3,304,273; 3,523,095; 3,110,695 and German Pat. No. 1,152,536).

Among the polythioethers should be mentioned the condensation products obtained from thiodiglycol on its own and/or with other glycols, dicarboxylic acids, formaldehyde, aminocarboxylic acids or amino alcohols. The products obtained are either polythiomixed ethers or polythio ether esters or polythioether ester amides, depending on the cocomponents.

Suitable polyacetals include e.g. the compounds which can be prepared from glycols such as diethylene glycol, triethylene glycol, 4,4'-dioxethoxy-diphenyl-dimethyl-methane, hexanediol and formaldehyde. Polyacetals suitable for the purpose of the invention may also be prepared by the polymerization of cyclic acetals.

Polycarbonates containing hydroxyl groups include those known per se such as the products obtained from the reaction of diols such as propanediol-(1,3), butanediol-(1,4) and/or hexanediol-(1,6), diethyleneglycol, triethylene glycol or tetraethylene glycol with diarylcarbonates, e.g. diphenylcarbonate, or phosgene.

Suitable polyester amides and polyamides include e.g. the predominantly linear condensates obtained from polyvalent saturated and unsaturated carboxylic acids or their anhydrides and polyvalent saturated and unsaturated amino alcohols, diamines, polyamines or mixtures thereof.

Mixtures of the above-mentioned high molecular weight and low molecular weight dispersing agents may of course also be used as already mentioned above.

The hydroxyl compounds and mixtures thereof used as dispersing agents should be chosen so that they are liquid at the temperature at which the aqueous dispersion is added according to the invention (10°–100° C, preferably 30°–80° C). If desired and/or necessary, this limitation can be met by the addition of an inert solvent. Their viscosity should generally be below 20,000 cP and preferably below 5000 cP so that conventional stirrer and mixing apparatus can be employed.

If inert solvents are to be used, they should preferably distill off before water or as azeotropic mixtures with water. Specific examples include acetone, tetrahydrofuran, benzene and toluene.

As already mentioned above, both cationic and anionic, as well as non-ionic, polyurethane dispersions can be prepared by the above mentioned process. It is preferred to use aqueous polyurethane dispersions of the kind which dry to form polyurethane foils which have elastic properties. These include in particular rubbery elastic or, at least, impact resistant polyurethanes or polyureas or polyhydrazodicarbonamides which have a ball pressure hardness below 1400 kp/cm$^2$ (60 seconds according to DIN 53 456) and preferably a Shore hardness D of less than 55 and most preferably a Shore hardness A of less than 98. Harder polyurethanes may, of course, also be used as dispersions for special purposes.

In a broad sense, suitable aqueous polyurethane dispersions can be obtained by the process described above if the starting materials used for the preparation of the polyurethanes include components which contain ionic groups or groups capable of forming ions and, in addition, at least one isocyanate group or at least one hydrogen atom which is reactive with isocyanate groups. The following are examples of compounds of this kind which may be used either alone or as mixtures:

(1) Compounds containing tertiary or basic amino groups which can be quaternized or neutralized with aqueous acids:
 (a) Alcohols, in particular alkoxylated aliphatic, cycloaliphatic, aromatic and heterocyclic secondary amines, e.g. N,N-dimethylethanolamine, N,N-diethylethanolamine, N,N-dibutylethanolamine, 1-dimethylamino-propanol-(2), N,N-methyl-β-hydroxyethylaniline, N,N-methyl-β-hydroxypropyl-aniline, N,N-ethyl-βhydroxyethylaniline, N,N-butyl-β-hydroxyethylaniline, N-hydroxyethylpiperidine, N-hydroxyethylmorpholine, α-hydroxyethylpyridine and γ-hydroxyethylquinoline;
 (b) Diols and triols, in particular alkoxylated aliphatic, cycloaliphatic, aromatic and heterocyclic primary amines, e.g. N-methyldiethanolamine, N-butyl-diethanolamine, N-oleyldiethanolamine, N-cyclohexyl-diethanolamine, N-methyldiisopropanolamine, N,N-diethoxylaniline, N,N-diethoxyl-m-toluidine, N,N-diethoxyl-p-toluidine, N,N-dipropoxylnaphthylamine, N,N-tetraethoxyl-α-aminopyridine, diethoxypiperazine, polyethoxylated butyl diethanolamine, polypropoxylated methyl diethanolamine (molecular weight 1000), polypropoxylated methyl diethanolamine (molecular weight 2000), polyesters having tertiary amino groups, tri-[2-hydroxypropyl-(1)]-amine, N,N-di-n-(2,3-dihydroxypropyl)-aniline, N,N'-dimethyl-N,N'-bis-ethoxyl-hydrazine and N,N'-dimethyl-N,N'-bis-propoxyl-ethylenediamine;
 (c) Aminoalcohols, e.g. addition products, obtained by hydrogenation, of alkylene oxide and acrylonitrile to primary amines, such as N-methyl-N-(3-aminopropyl)-ethanolamine, N-cyclohexyl-N-(3-aminopropyl)-propanol-(2)-amine, N,N-bis-(3-aminopropyl)-ethanolamine and N-3-aminopropyl-diethanolamine;
 (d) Amines, e.g. N,N-dimethylhydrazine, N,N-dimethyl-ethylene diamine, 1-di-ethylamine-4-amino-pentane, α-aminopyridine, 3-amino-N-ethyl-carbazole, N,N-dimethylpropylene diamine, N-aminopropyl-piperidine, N-aminopropyl-morpholine, N-aminopropyl-ethyleneimine and 1,3-bis-piperidino-2-amino-propane;
 (e) Diamines, triamines and amides, in particular those obtained by the hydrogenation of addition products of acrylonitrile to primary or di-secondary amines, e.g. bis-(3-aminopropyl)-methylamine, bis-(3-aminopropyl)-cyclohexylamine, bis-(3-aminopropyl)-aniline, bis-(3-aminopropyl)-toluidine, diamino-carbazole, bis-(aminopropoxyethyl)-butylamine, tris-(aminopropyl)-amine or N,N'-bis-carbonamidopropylhexamethylenediamine as well as compounds obtained by the addition of acrylamide to diamines or diols;

(2) Compounds containing halogen atoms capable of quarternization reactions or the corresponding esters of strong acids:
 2-Chloroethanol, 2-bromoethanol, 4-chlorobutanol, 3-bromopropanol, β-chloroethylamine, 6-chlorohexylamine, ethanolamine-sulphuric acid ester, N,N-bis-hydroxyethyl-N'-m-chloromethyl-phenylurea, N-hydroxyethyl-N'-chlorohexylurea, glyceroamino-chloroethylurethane, chloroacetylethylenediamine, bromoacetyl-dipropylenetriamine, trichloroacetyl-triethylene tetramine, glycero-α-bromo-hydrin, polypropoxylated glycerol-α-chlorohydrin, polyesters having aliphatically bound halogen or 1,3-dichloropropanol-2;

The following are mentioned as examples of corresponding isocyanates:
Chlorohexylisocyanate, m-chlorophenyl isocyanate, p-chlorophenyl isocyanate, bis-chloromethyl-diphenylmethane-diisocyanate, 2,4-diisocyanato-benzyl chloride, 2,6-diisocyanato-benzyl chloride and N-(4-methyl-3-isocyanatophenyl)-β-bromoethylurethane.

(3) Compounds containing carboxylic or hydroxyl groups which are capable of salt formation:
 (a) Hydroxy- and mercapto-carboxylic acids: Glycollic acid, thioglycollic acid, lactic acid, trichlorolactic acid, maleic acid, dihydroxymaleic acid, dihydroxyfumaric acid, tartaric acid, dihydroxytartaric acid, mucic acid, saccharic acid, citric acid, glyceroboric acid, pentaerythritoboric acid, mannitoboric acid, salicylic acid, 2,6-dihydroxybenzoic acid, protocatechuic acid, α-resorcylic acid, β-resorcylic acid, hydroquinone-2,5-dicarboxylic acid, 4-hydroxy-isophthalic acid, 4,6-dihydroxyisophthalic acid, hydroxyterephthalic acid, 5,6,7,8-tetrahydro-naphthol-(2)-carboxylic acid-(3), 1-hydroxynaphthoic acid-(2), 2,8-dihydroxynaphthoic acid-(3), β-hydroxypropionic acid, m-hydroxybenzoic acid, pyrazolone-carboxylic acid, uric acid, barbituric acid, and resols and other phenol formaldehyde condensation products;
 (b) Polycarboxylic acids: Sulphonyl diacetic acid, nitrilo-triacetic acid, ethylene diaminotetracetic acid, diglycollic acid, thiodiglycollic acid, methylene-bis-thioglycollic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, naphthalene tetracarboxylic acid-(1,4,5,8), o-tolyl-imido-diacetic acid, β-naphthylimido-diacetic acid, pyridino-dicarboxylic acid and dithiodipropionic acid;
 (c) Aminocarboxylic acids: Oxaluric acid, anilino acetic acid, 2-hydroxy-carbazolecarboxylic acid-(3), glycine, sarcosine, methionine, α-alanine, β-alanine, 6-aminocaproic acid, 6-benzoylamino-2-chlorocaproic acid, 4-amino-butyric acid, aspartic acid, glutamic acid, histidine, anthranilic acid, 2-ethylaminobenzoic acid, N-(2-carboxyphenyl)-aminoacetic acid, 2-(3'-amino-benzosulphonylamino)-benzoic acid, 3-aminobenzoic acid, 4-aminobenzoic acid, N-phenylaminoacetic acid, 3,4-diaminobenzoic acid, 5-aminobenzene-dicarboxylic acid, 5-(4'-aminobenzoylamino)-2-aminobenzoic acid;
 (d) Hydroxysulphonic and carboxysulphonic acids: 2-Hydroxyethane sulphonic acid, phenolsulphonic acid-(2), phenolsulphonic acid-(3), phenolsulphonic acid-(4), phenoldisulphonic acid-(2,4), sulphoacetic acid, m-sulphobenzoic acid, p-sulphobenzoic acid, benzoic acid-(1)-disulphonic acid-(3,5), 2-chloro-benzoic acid-(1)-sulphonic acid-(4), 2-hydroxy-benzoic acid-(1)-sulphonic acid-(5), naphthol-(1)-sulphonic acid, naphthol-(1)-disulphonic acid, 8-chloronaphthol-(1)-disulphonic acid, naphthol-(1)-trisulphonic acid, naphthol-(2)-sulphonic acid-(1), naphthol-(2)-trisulphonic acid, 1,7-dihydroxy-naphthalene sulphonic acid-(3), 1,8-dihydroxynaphthalene-disulphonic acid-(2,4), chromotropic acid, 2-hydroxy-naphthoic acid-(3)-sulphonic acid-(6), 2-hydroxycarbazole-sulphonic acid-(7);

(e) Aminosulphonic acids: Amidosulphonic acid, hydroxylamine monosulphonic acid, hydrazine disulphonic acid, sulphanilic acid, N-phenyl-amino-methanesulphonic acid, 4,6-dichloroaniline-sulphonic acid-(2), phenylenediamine-(1,3)-disulphonic acid-(4,6), N-acetyl-naphthylamine-(1)-sulphonic acid-(3), naphthyl-amine-(1)-sulphonic acid, naphthylamine-(2)-sulphonic acid, naphthylamine-disulphonic acid, naphthylamine-trisulphonic acid, 4,4'-di-(p-amino-benzoylamino)-diphenylurea-disulphonic acid-(3,3'), phenylhydrazine-disulphonic acid-(2,5), 2,3-dimethyl-4-aminoazobenzene-disulphonic acid-(4',5), 4'-amino-stilbene-disulphonic acid-(2,2')-4-azo-4-anisole, carbazole-disulphonic acid-(2,7), taurine, methyltaurine, butyl taurine, 3-aminobenzoic acid-(1)-sulphonic acid-(5), 3-aminotoluene-N-methanesulphonic acid, 6-nitro-1,3-dimethylbenzene-4-sulphamic acid, 4,6-diaminobenzene-disulphonic acid-(1,3), 2,4-diaminotoluene-sulphonic acid-(5), 4,4'-diaminodiphenyl-disulphonic acid-(2,2'), 2-aminophenol-sulphonic acid-(4), 4,4'-diamino-diphenyl-ether-sulphonic acid-(2), 2-aminoanisole-N-methanesulphonic acid and 2-amino-diphenyla-mine-sulphonic acid.

The salt forming agents for compounds of Group 1 may be inorganic or organic acids or compounds containing reactive halogen atoms or corresponding esters of strong acids. The following are some examples of such compounds: Hydrochloric acid, nitric acid, hypophosphorous acid, amido-sulphonic acid, hydroxylamine monosulphonic acid, formic acid, acetic acid, glycollic acid, lactic acid, chloroacetic acid, ethylbromoacetate, sorbitoboric acid, methyl chloride, butyl bromide, dimethylsulphate, diethyl sulphate, benzyl chloride, p-toluenesulphonic acid methyl ester, methyl bromide, ethylene chlorohydrin, ethylene bromohydrin, glycero-α-bromohydrin, ethyl chloroacetate, chloroacetamide, bromoacetamide, dibromoethane, chlorobromobutane, dibromobutane, ethylene oxide, propylene oxide, and 2,3-epoxy-propanol.

The compounds of Group 2 may be quaternized or ternized with tertiary amines or also with sulphides or phosphines. Quaternary ammonium and phosphonium salts and ternary sulphonium salts are thereby obtained. Examples of such compounds include trimethylamine, triethylamine, tributylamine, pyridine, triethanolamine, and the compounds mentioned under Groups 1 (a) and 1 (b); and dimethyl sulphide, diethylsulphide, thiodiglycol, thiodiglycollic acid, trialkylphosphines, alkylarylphosphines and triarylphosphines.

Inorganic and organic bases may be used as salt forming agents for compounds of Group 3, e.g. sodium hydroxide, potassium hydroxide, potassium carbonate, sodium bicarbonate, ammonia and primary, secondary and tertiary amines. Organic phosphorus compounds may also be used as compounds capable of salt formation, both basic phosphines which can be built into the molecule, e.g. diethyl-β-hydroxyethyl phosphine, methyl-bis-β-hydroxyethyl phosphine or tris-β-hydroxymethyl-phosphine and derivatives, e.g. of phosphinic acids, phosphonous acids and phosphinic acids as well as esters of phosphorous and phosphoric acid and their thioanalogues, e.g. bis-(α-hydroxyisopropyl)-phosphinic acid, hydroxyalkane phosphonic acid or phosphoric acid-bisglycol ester.

Cationic polyurethanes suitable for the purpose of the invention may be obtained e.g. according to German Auslegeschrift No. 1,270,276, if at least one of the components used for the preparation of the polyurethane contains one or more basic tertiary nitrogen atoms and the basic tertiary nitrogen atoms of the polyurethane are reacted with alkylating agents or inorganic or organic acids. It is immaterial in what position of the polyurethane macromolecule the basic nitrogen atoms are situated.

Conversely, polyurethanes containing reactive halogen atoms capable of quaternizing reactions may be reacted with tertiary amines. Furthermore, cationic polyurethanes may also be synthesized by a chain lengthening quaternizing reaction, for example, by preparing dihalogenated urethanes from optionally higher molecular weight diols and isocyanates having halogen atoms or diisocyanates and halogenated alcohols and then reacting these dihalogenated urethanes with ditertiary amines. Conversely, ditertiary diaminourethanes may be prepared from compounds containing two isocyanate groups and tertiary amino alcohols and then reacted with reactive dihalogen compounds. The cationic polyurethane may, of course, also be prepared from a cationic salt compound used as starting material, for example, a quaternized basic polyether or an isocyanate containing a quaternary nitrogen. These methods of preparation are known and have been described, for example, in German Auslegeschriften Nos. 1,184,946; 1,178,586 and 1,179,363; U.S. Pat. No. 3,686,108 and Belgian Pat. Nos. 653,223; 658,026 and 636,799, which also set forth suitable starting materials for the synthesis of the salt type polyurethanes.

Preparation of anionic polyurethane (urea) dispersions may also be carried out by known methods. Suitable anionic polyurethanes have been described, for example, in German Auslegeschrift No. 1,237,306, and German Offenlegungsschriften Nos. 1,570,556; 1,720,639 and 1,495,847. It is preferable to use starting compounds in which the ionic groups are carboxyl groups or sulphonate groups.

Anionic dispersions may also be prepared from polyurethanes containing free hydroxyl and/or amino groups by reacting them with aliphatic or aromatic aldehydes and, at the same time or subsequently, with a metal sulphite, metal hydrosulphite, metal aminocarboxylate or metal amino sulphate. Another possibility consists of reacting polyurethanes having free hydroxyl and/or amino groups with cyclic compounds which have from 3 to 7 ring members and contain salt groups or groups which are capable of salt formation after ring opening as described in German Auslegeschrift No. 1,237,306. Such compounds include, in particular, sultones such as 1,3-propane-sultone, 1,4-butanesultone and 1,8-naphthosultone, lactones such as β-propiolactone and γ-butyrolactone and dicarboxylic acid anhydrides, such as succinic acid anhydride.

Suitable cationic or anionic polyurethanes for the process according to the invention may also be prepared by a formaldehyde polycondensation process according to German Offenlegungsschrift No. 1,770,068 in which higher molecular weight polyisocyanates are reacted with an excess of compounds which have methylol end groups (e.g. amine formaldehyde resins or phenol formaldehyde resins) and the reaction product which contains methylol groups is dispersed in water and finally cross-linked by heat treatment to form methylene bridges.

It is also possible but less preferable to use products of the kind described in German Offenlegungsschriften Nos. 1,953,345; 1,953,348 and 1,953,349 for the process of preparing the dispersions. These are aqueous dispersions of ionic emulsion polymers which are prepared by radical emulsion polymerization of olefinically unsaturated monomers in the presence of cationic or anionic oligourethanes or polyurethanes.

Sedimenting but redispersible aqueous dispersions of cationic or anionic polyurethanes which are chemically cross-linked may also be used.

The preparation of such cross-linked pulyurethane particles is not a subject of this invention. It can be carried out by various methods which are in general already known to the expert. In general, cross-linked polyurethane particles can be prepared either as suspensions in suitable organic solvents or in water or without the aid of a liquid medium. Furthermore, with suitable choice of reactants, any of these processes may be carried out to yield cross-linked particles directly. Alternatively, predominantly linear thermoplastic particles may first be prepared which may subsequently be cross-linked.

The solvent used for preparing a suspension in an organic medium is generally one which will dissolve one or more of the reactants but not the high molecular weight reaction product. In the course of a reaction carried out in such a medium, the solution initially formed is gradually converted into a suspension, this process being advantageously assisted by stirring. It is important to ensure that the cross-linking process will not take place until the disperse phase has formed because gelling will otherwise take place. One may also use solvents in which the already high molecular weight but not yet cross-linked polyurethane will dissolve with heating but not at room temperature. The suspension can then be obtained from the solution by cooling with stirring. The same effect can also be achieved by the addition of a non-solvent which should be miscible with the solvent. The formation of a disperse phase of particles having the desired size may be influenced by the addition of suitable dispersing agents.

Other methods are known for producing finely divided polyurethanes in aqueous medium. Thus, for example, the solution of a polyurethane in a solvent which is immiscible with water may be dispersed in water with the aid of an emulsifier, the organic solvent being then removed by distillation. According to a particularly preferred method, ionically and/or hydrophilically modified polyurethanes are mixed with water with or without solvent. This procedure results in the formation of polyurethane suspensions, depending on the constitution and the reaction conditions employed. According to a particularly preferred variation of this process, polyurethane prepolymers which have isocyanate or methylol end groups are used, either in very high percentage solutions or completely without solvent. The coarse emulsions originally formed undergo chain lengthening and cross-linking into high molecular weight polyurethane urea suspensions as a result of the reaction of the isocyanate groups with water or with the diamine or polyamines dissolved in the aqueous phase. Chain lengthening of prepolymers containing methylol groups can be achieved, for example, by heating or by lowering the pH.

Suitable suspensions can also be obtained by injecting high molecular weight polyurethanes or their reactive precursors into water or organic non-solvents. In principle, any methods which have been proposed for preparing polyurethane dispersions or latices are also suitable for preparing polyurethane suspensions, provided that care is taken to ensure that these suspensions will not coalesce due to sedimentation or shearing forces. This means that a primary suspension which has not yet reached a sufficiently high molecular weight should be kept in motion until the dispersed particles are free from tackiness. To achieve cross-linking of the dispersed particles, one may either use more than bifunctional starting materials in the preparation of the polyurethane, in other words, branched polyesters or polyethers, triisocyanates or triols. Alternatively, an isocyanate prepolymer which is originally linear, in other words one which has been prepared from bifunctional components, may be reacted with higher functional amines to produce cross-linked polyurethane urea. Alternatively, cross-linked particles may be built up from purely bifunctional components if suitable conditions are employed to bring about branching reactions, for example, the addition of catalysts which promote isocyanate trimerization or the formation of allophanate or biuret structures. In the presence of water and/or diamines, cross-linking can frequently be achieved simply by using more than equivalent quantities of isocyanate, based on the quantity of hydroxyl or amino compounds present. Linear high molecular weight polyurethanes can also be subsequently cross-linked in the form of a suspension in a liquid medium, e.g. by treating them with polyisocyanates or formaldehyde or compounds from which formaldehyde can be split off. Products containing basic groups may be cross-linked, for example, with polyfunctional quaternizing agents or acids while products containing acid groups may be cross-linked with metal oxides or polyamines. Compounds suitable for cross-linking polyurethanes which contain unsaturated double bonds include, for example, the known radical forming substances or sulphur, polymercaptans or other at least bifunctional substances which are capable of reacting with double bonds.

A detailed description of the preparation of cross-linked ionic polyurethane suspensions may be found, for example, in U.S. Pat. No. 3,479,310; Canadian Pat. No. 837,174; British Pat. No. 1,158,088; U.S. Pat. Nos. 3,714,095; 3,622,527; British Pat. No. 1,175,339; and U.S. Pat. No. 3,756,992.

In addition to cationic and anionic polyurethane dispersions, the process may also be carried out using non-ionic, self-emulsifying aqueous polyurethane dispersions, as already mentioned above.

The preparation of non-ionic, emulsifier-free polyurethane dispersions may be carried out, for example, by the process according to German Offenlegungsschrift 2,141,807:

1 mol of a trifunctional polyether polyol is reacted with 3 mols of diisocyanate. The resulting adduct, which contains isocyanate groups, is reacted with a mixture of (a) a monofunctional low molecular weight alcohol and (b) a reaction product of a monofunctional alcohol or monocarboxylic acid and ethylene oxide (molecular weight about 600) to form a prepolymer containing about 1 mol of the monofunctional polyethylene oxide adduct to 3000 molecular weight units. This prepolymer is emulsified in water with the aid of mechanical dispersing apparatus to form a latex which is finally polymerized by the reaction with water or some other chain lengthening agent known from polyurethane chemistry. The latices are prepared using so little water that the solids content is above 45% by weight and preferably above 50% by weight.

Suitable self-dispersible, non-ionic polyurethane dispersions may also be prepared by incorporating polyethylene oxide units in linear polyurethanes so that they are attached through allophanate or biuret groups in side chains. The preparation of such polyurethanes which can be dispersed in water without the aid of dispersing agents is carried out by the known methods of polyurethane chemistry of reacting organic compounds having molecular weights in the range of from 500 to 6000, preferably 600 to 3000 which are difunctional for the purpose of the isocyanate polyaddition reaction and contain end groups capable of reacting with isocyanate groups, with organic diisocyanates and, optionally, the difunctional chain lengthening agents known in polyurethane chemistry which have a molecular weight below 500. In this reaction, it is important that some or all of the organic diisocyanates should be compounds of the general formula

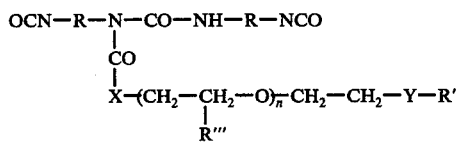

in which

R represents an organic radical obtainable by removal of the isocyanate groups from an organic diisocyanate having a molecular weight in the range of from 112 to 1000, R' represents a monovalent hydrocarbon group having from 1 to 12 carbon atoms, X and Y may be the same or different and represent oxygen or a group of the formula —N(R")— in which R" represents a monovalent hydrocarbon group having from 1 to 12 carbon atoms, R''' represents hydrogen and may also partially represent methyl and n represents an integer of from 9 to 89.

These special diisocyanates are preferably used as mixtures with unmodified diisocyanates of the general formula $R(NCO)_2$, and the diisocyanate mixtures used preferably contain from 5 to 100 and preferably 10 to 50 mol % of the modified diisocyanates.

Suitable difunctional compounds containing end groups which are reactive with isocyanates and having a molecular weight of from 500 to 6000, preferably 600 to 3000, include in particular the following:

1. The dihydroxypolyesters known per se in polyurethane chemistry, obtained from dicarboxylic acids such as succinic acid, adipic acid, suberic acid, azelaic acid, sebacic acid, phthalic acid, isophthalic acid, terephthalic acid, tetrahydrophthalic acid, etc. and diols such as ethylene glycol, propylene-1,2-glycol, propylene-1,3-glycol, diethylene glycol, butane-1,4-diol, hexane-1,6-diol, octane-1,8-diol, neopentyl glycol or 2-methylpropane-1,3-diol or the various isomeric bis-hydroxyethylcyclohexanes;

2. the known polylactones of polyurethane chemistry, e.g. polymers of ε-caprolactone started on the above-mentioned dihydric alcohols;

3. the known polycarbonates of polyurethane chemistry which can be obtained, for example, by reacting the above mentioned diols with diarylcarbonates or phosgene;

4. the known polyethers of polyurethane chemistry, e.g. polymers or copolymers of styrene oxide, propylene oxide, tetrahydrofuran, butylene oxide or epichlorohydrin obtained with divalent starter molecules such as water, the above mentioned diols or amines containing two NH bonds;

5. the known polythioethers, polythiomixed ethers and polythioether esters of polyurethane chemistry;

6. the known polyacetals of polyurethane chemistry, for example, those obtained from the above mentioned diols and formaldehyde; and 7. difunctional polyether esters having end groups which are reactive with isocyanate groups.

The compounds preferably used are dihydroxypolyesters, dihydroxypolylactones and dihydroxypolycarbonates.

Suitable chain lengthening agents with a molecular weight below 500 include, for example, the low molecular weight diols described for the preparation of dihydroxy polyesters, or diamines such as diaminoethane, 1,6-diaminohexane, piperazine, 2,5-dimethylpiperazine, 1-amino-3-aminomethyl-3,5,5-trimethyl-cyclohexane, 4,4'-diaminodicyclohexylmethane, 1,4-diaminocyclohexane and 1,2-propylene diamine as well as hydrazine, amino acid hydrazides, hydrazides of semicarbazidocarboxylic acids, bis-hydrazides and bis-semicarbazides.

Suitable diisocyanates of the general formula $R(NCO)_2$ include the diisocyanates known in polyurethane chemistry particularly those in which R is a divalent aliphatic hydrocarbon group having from 2 to 18 carbon atoms, a divalent cycloaliphatic hydrocarbon group having from 4 to 15 carbon atoms, a divalent aromatic hydrocarbon group having from 6 to 15 carbon atoms or an araliphatic hydrocarbon group having from 7 to 15 carbon atoms. The following are typical representatives of such diisocyanates: Ethylene diisocyanate, tetramethylene diisocyanate, hexamethylene diisocyanate, dodecamethylene diisocyanate, cyclohexane-1,3- and -1,4-diisocyanate, 1-isocyanato-3-isocyanatomethyl-3,5,5-trimethyl-cyclohexane, 4,4'-diisocyanato-dicyclohexylmethane or aromatic diisocyanates such as 2,4-diisocyanatotoluene, 2,6-diisocynatotoluene, mixtures of these isomers, 4,4'-diisocyanatodiphenylmethane, 1,5-diisocyanatonaphthalene, and the like.

Preparation of the modified allophanate diisocyanates may be carried out, for example, by heating 1 mol of a monofunctional alcohol of the general formula

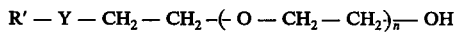

with two mols of one of the above mentioned diisocyanates of the general formula $R(NCO)_2$. The urethane formed in the first stage subsequently reacts with a second mol of diisocyanate at a higher temperature to form the allophanate diisocyanate. If desired, trimerization of the diisocyanate can be prevented in a manner similar to the method described in German Auslegeschrift No. 2,009,179 by the addition of catalytic quantities of alkylating agents such as p-toluenesulphonic acid esters. If desired, the allophanatization reaction may also be catalyzed according to German Offenlegungsschrift 2,040,645 by the addition of certain metal compounds, e.g. zinc acetyl acetonate.

Biuret diisocyanates, which may be used instead of allophanate diisocyanates, may be prepared by converting a monohydric alcohol of the formula

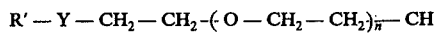

into a secondary amine of the general formula

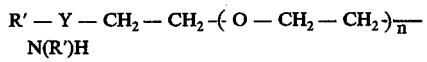

for example, by the known reaction with N-substituted ethylene imines or by a condensation reaction of the alcohols with primary amines using a molar ratio between 1:1 and 1:10. If ethylene imine derivatives are used, the number n is increased to n+1. The resulting secondary amines containing polyethylene oxide units are then converted into the biuret diisocyanates required for the preparation of the self-dispersible dispersions by reacting 1 mol of the secondary amine with at least 2 mols of a diisocyanate of the general formula $R(NCO)_2$. In the first stage of this reaction, the secondary amine reacts with 1 mol of diisocyanate to form the urea isocyanate which then reacts with a second mol of diisocyanate at a higher temperature to form a biuret diisocyanate. In this reaction again trimerization of the diisocyanate can be suppressed by catalytic quantities of alkylating agents such as p-toluenesulphonic acid esters.

For the preparation of the self-dispersible polyurethanes the biuret diisocyanates are, like the allophanate diisocyanates, used as mixtures with unmodified diisocyanates of the formula $R(NCO)_2$, these mixtures containing from 5 to 100 and preferably 10 to 50 mol percent of modified diisocyanates. One may, of course, also use mixtures of allophanate diisocyanates and biuret diisocyanates.

The monohydric alcohols with polyethylene oxide units required for preparing the modified diisocyanates are obtained in known manner by ethoxylation of monohydric alcohols or monovalent phenols of the general formula R'-O-H or by ethoxylation of secondary amines of the general formula

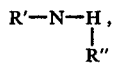

in which R' and R" represent the same or different hydrocarbon groups, in particular $C_1$-$C_{10}$ alkyl groups, $C_4$-$C_8$ cycloalkyl groups, $C_6$-$C_{12}$ aryl groups or $C_7$-$C_{10}$ aralkyl groups. Examples of suitable alcohols or phenols include methanol, ethanol, n-propanol, n-hexanol, n-dodecanol, isopropanol, tertiary butanol, phenol, p-cresol and benzyl alcohol. The following are examples of suitable secondary amines: Dimethylamine, diethylamine, dipropylamine, N-methylhexylamine, N-ethyldecylamine, N-methylaniline, N-ethyl-benzylamine and N-methylcyclohexylamine.

The quantity of ethylene oxide grafted on the molecule may vary within wide limits but, in general, the polyethylene oxide chains consist of from 10 to 90, preferably 20 to 70, ethylene oxide units.

Conversion of the polyethylene oxide alcohols into the corresponding secondary amines is carried out in known manner using N-substituted ethylene imines of the general formula

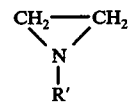

or primary amines of the general formula R'—NH$_2$ in which R' has the meaning already specified.

Preparation of the polyurethanes which are dispersible in water is carried out by the known methods of polyurethane chemistry of reacting higher molecular weight dihydroxyl compounds with diisocyanates or diisocyanate mixtures, optionally with the addition of the chain lengthening agents mentioned, and using either the one-shot process or the two-stage process (prepolymer process).

For preparing the self-dispersible polyurethanes, the reactants are used in proportions corresponding to a ratio of isocyanate groups to groups capable of reacting with isocyanate groups of between 0.8:1 and 2.5:1, preferably between 1:1 and 1.1:1. These ratios do not include the quantity of water which may already be present during preparation of the dispersible polyurethanes. If an excess of isocyanate is used, the reaction products obtained will, of course, contain isocyanate groups and, when dispersed in water, they will continue to react with the water to form polyurethane-polyureas which are free from isocyanate groups. The quantity of modified diisocyanates used for the quantity of polyethylene oxide units in these diisocyanates is chosen so that the finished polyurethane will contain from 3 to 30, preferably 5 to 20 percent by weight of side chain polyethylene oxide segments.

Both the one-shot process and the two-shot process may be carried out either with or without solvents. Suitable solvents are miscible with water and inert towards isocyanate groups and have a boiling point below 100°C, for example, acetone or methyl ethyl ketone.

Conversion of the dissolved polyurethane elastomers into an aqueous dispersion is suitable carried out by the addition of water to the solution with stirring. In many cases, the elastomer will pass through the phase of a water-in-oil emulsion before it overcomes a viscosity maximum and at the same time changes into an oil-in-water emulsion. Removal of the solvent by distillation leaves behind a purely aqueous stable dispersion.

The polyurethane elastomers prepared as described above could, in principle, also be converted into dispersions by other methods, for example, the method of dispersion without solvents, e.g. by mixing the elastomer melt with water in apparatus capable of producing high shearing forces or by using very small quantities of solvents for plasticizing the melt in the same apparatus or the aid of non-mechanical dispersing agents such as sound waves of extremely high frequency.

Self-dispersible, non-ionic polyurethane dispersions can also be obtained by introducing polyethylene oxide side chains via the diol component. In addition to the above mentioned higher molecular weight diols, diisocyanates of the formula $R(NCO)_2$ and, optionally, chain lengthening agents, diols of the following general formula are used:

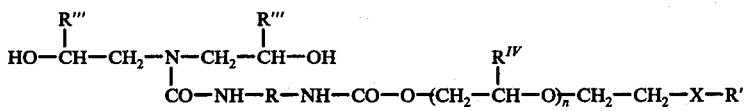

in which

R represents a divalent group such as can be obtained by removal of the isocyanate groups from a diisocyanate having a molecular weight of from 112 to 1000;

X represents oxygen or —NR″—,

R′ and R″ may be the same or different and represent a monovalent hydrocarbon group having from 1 to 12 carbon atoms, R‴ represents hydrogen or a monovalent hydrocarbon group having from 1 to 8 carbon atoms, $R^{IV}$ represents hydrogen and, optionally, in part also methyl and n represents an integer of from 4 to 89.

These compounds will hereinafter be referred to as hydrophilic chain lengthening agents.

Preparation of the hydrophilic chain lengthening agents may be carried out, for example, as follows:

Monovalent alcohols containing polyethylene oxide units as represented by the following formula:

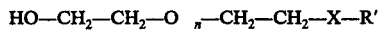

are first prepared by ethoxylation of corresponding secondary amines of the general formula

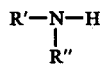

or alcohols or monovalent phenols of the general formula R′—O—H (X = 0) in known manner as described above.

The quantity of ethylene oxide to be grafted on to the molecule may vary within wide limits but here again the polyethylene oxide chains generally consist of from 5 to 90 and preferably 20 to 70 ethylene oxide units.

In a second reaction stage, the resulting monovalent alcohols containing polyethylene oxide units are then reacted with a large excess of one of the diisocyanates of the general formula R(NCO)₂ given as examples above, and the diisocyanate excess is subsequently removed to yield the corresponding monoisocyanate containing polyethylene oxide units as represented by the general formula.

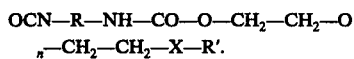

In this second reaction step, the diisocyanate is preferably used in a 2 to 10 times molar excess, more preferably a 3 to 4 times molar excess, to prevent the formation of the corresponding bisurethanes free from isocyanate groups. In this second reaction step, the monohydric alcohol containing polyethylene oxide units is preferably added to the diisocyanate in the reaction vessel. The reaction is carried out at from 70° C to 130° C. Subsequent removal of the diisocyanate excess is preferably carried out by vacuum thin layer distillation at 100° C to 180° C.

The hydrophilic chain lengthening agent is then obtained in a third step by reaction of the above-described monoisocyanates which contain polyethylene oxide units with dialkanolamines of the general formula

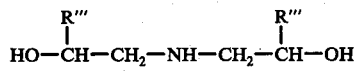

in which R‴ has the meaning already specified. The components are preferably used in stoichiometric proportions in this third reaction step and the reaction is preferably carried out at temperatures between 0° C and 50° C and in particular at 15° to 30° C. Suitable alkanolamines of the above general formula are, for example, diethanolamine, dipropanolamine (R‴ = CH₃) and bis-(2-hydroxy-2-phenylethyl)-amine.

In this case again preparation of the self dispersible polyurethanes may be carried out either by the one shot process or by the two-shot prepolymer process.

The reactants for preparing the self-dispersible polyurethanes are used in proportions corresponding to an equivalent ratio of isocyanate groups to groups capable of reacting with isocyanates of between 0.8:1 and 2.5:1 and preferably between 0.95:1 and 1.5:1.

The hydrophilic chain lengthening agents are used in quantities resulting in from 3 to 30% by weight and preferably 5 to 20% by weight of polyethylene oxide segments in side chains in the polyurethane finally obtained.

Dispersion of the polyurethane is carried out in analogous manner as described above.

The final viscosity of a dispersion of a polyurethane(urea) or polyhydrazodicarbonamide in a polyol depends, apart from its solid content, mainly on the interactions between the polyurethane components and the dispersing agent, particularly important factors being the hydrophilic or hydrophobic character as well as any partial solvation of the dispersed polyurethane by the dispersing agent, the mutual compatibility (miscibility) of dispersing agent and components from which the polyurethane is synthesized as well as the molecular structure of the polyurethane. The residual water content, is of course also very important.

It is a special advantage that, by virtue of these complex interactions as well as the very wide variety of possible polyisocyanate polyaddition products one can achieve optimum and predetermined changes and improvements in the properties both of the polyol dispersions and of the modified polyurethane resins produced from them. This is an advantage not afforded by the polymer latices, which moreover are less stable.

As much of the water from the aqueous dispersion may be left in the hydroxyl containing dispersing agent as is required for its subsequent use, for example, for the production of polyurethane foams according to the present invention. The quantity of water required for this purpose is generally less than 10% by weight and preferably from 0.5 to 5% by weight. If, on the other hand, the dispersion are to be used for the production of homogeneous polyurethanes or if blowing agents other than water are to be used in the reaction of the polyol dispersions with polyisocyanates, then the products of the process may be virtually completely freed from water, preferably under reduced pressure. The removal of water may also be facilitated by passing a stream of inert carrier gas such as carbon dioxide or nitrogen through the mixture.

If the addition of water to the polyol causes too high a rise in the viscosity of the polyol, the aqueous polyurethane dispersion may, of course, be added slowly and continuously or in small portions to the polyol in an apparatus equipped with stirrer while the water is distilled off, preferably at reduced pressure.

It is generally desired to have a solid content of about 5 to 50% by weight in the dispersions but for some purposes it is sufficient to modify the polyol with a smaller proportion of polyurethane solids, for example, only 1% by weight, in order to obtain end products with improved mechanical properties.

The dispersions may, as already mentioned above, be used according to the present invention as "modified" low molecular weight or higher molecular weight polyhydroxyl compounds to be reacted in known manner with polyisocyanates, optionally unmodified polyhydroxyl compounds or polyamines, hydrazines or hydrazides as chain lengthening agents and optionally blowing agents, catalysts and other additives to produce polyurethane resins with improved mechanical properties. Examples of products which may be produced in this way includes foams, elastomers, homogeneous and porous coatings, lacquers and thermoplastic polyurethanes. The products of the process may, of course, also be used either directly or after conversion into modified prepolymers by reaction with a polyisocyanate excess for the production of aqueous polyurethane dispersions by known methods.

Among the properties which the above mentioned products are intended to improve in the polyurethane resins produced from them, which are above all improved hardness, tensile strength and elasticity, one which is particularly important is the particle size of the dispersed polyaddition products.

Thus, for example, when using polyol dispersions as starting material for the production of polyurethane foams, the diameter of the solid particles must be substantially below the dimensions of the cell walls (20 to 50 $\mu$m). In polyurethane coatings the particles must be so small that even when the polyurethanes are applied very thinly they give rise to uniform coatings with a smooth surface. One of the advantages of the described process is that, with suitable choice of the aqueous dispersions used, it is possible to obtain products in which the particle size of the dispersed polyaddition products is of the order of 0.01 to 5 $\mu$m, preferably 0.1 to 1 $\mu$m, which is the optimum range for the practical requirements.

A particularly preferred use of the dispersions is the production of modified foams. In this case, the hydroxyl groups of the dispersing agent are reacted with polyisocyanates in the presence of blowing agents, the water left in the dispersions from the process used for their preparation optionally serving as blowing agent. If desired, other compounds reactive with isocyanates, catalysts, organic blowing agents, fillers, additives, etc. may also be used in known manner.

Polyols which have been modified by ionic polyurethanes or polyurethane ureas can be used for producing foams which contains ionic groups, in other words foams which have been rendered hydrophilic. Such hydrophilic foams have, for example, the property of being more easily wetted and they are capable of absorbing larger quantities of water, depending on their hydrophilic character, than conventional products. They may be used, for example, as ion exchangers.

According to a particular variation of the process of the invention for the production of foams, aqueous polymer latices may be added to the reaction mixture before foaming e.g. by analogy with the process according to German Offenlegungsschrift No. 2,014,385 and U.S. Pat. No. 2,993,013. This addition of polymer latices provides the opportunity for further modification of the properties of the foam.

The foams produced according to the invention which contain ionic groups have a substantially higher conductivity than conventional, non-ionic products. They are particularly suitable for processing by high frequency welding methods known per se. Their dye absorption is also considerably increased.

The polyisocyanates used for the reaction with the dispersions prepared according to the invention may be aliphatic, cycloaliphatic, araliphatic, aromatic or heterocyclic polyisocyanates such as those described, for example, by W. Siefken in Justus Liebigs Annalen der Chemie, 562, pages 75 to 136, for example, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethylcyclohexane as described in German Auslegeschrift No. 1,202,785 and U.S. patent specification No. 3,401,190, 2,4- and 2,6-hexahydrotolylene diisocyanate and any mixtures of these isomers, hexahydro-1,3- and/or 1,4-phenylene diisocyanate, perhydro-2,4'- and/or 4,4'-diphenylmethane diisocyanate, 1,3- and 1,4- phenylenediisocyanate, 2,4- and 2,6-tolylene diisocyanate and any mixtures of these isomers, diphenylmethane-2,4'- and-/or 4,4'-diisocyanate, naphthylene-1,5-diisocyanate, triphenylmethane-4,4',4''-triisocyanate, polyphenylpolymethylene polyisocyanates of the kind obtained by aniline formaldehyde condensation followed by phosgenation as described, for example, in British Pat. Nos. 874,430 and 848,671, m- and p-isocyanatophenyl sulphonylisocyanates as described in U.S. Pat. No. 3,454,606, perchlorinated aryl polyisocyanates as described e.g. in German Auslegeschrift No. 1,157,601 and U.S. Pat. No. 3,277,138, polyisocyanates having carbodiimide groups as described in German Pat. No. 1,092,007 and U.S. Pat. No. 3,152,162 the diisocyanates described in U.S. Pat. No. 3,492,300; polyisocyanates containing allophanate groups as described in British Pat. No. 994,890; Belgian Pat. No. 761,626 and published Dutch patent application No. 7,102,524; polyisocyanates having isocyanurate groups as described e.g. in U.S. Pat. No. 3,001,973, German Pat. Nos. 1,022,789; 1,222,067 and 1,027,394 and German Offenlegungsschriften Nos. 1,929,034 and 2,004,048; polyisocyanates having urethane groups as described e.g. in Belgian Pat. No. 752,261 and U.S. Pat. No. 3,394,164, polyisocyanates having acylated urea groups according to German Pat. No. 1,230,778; polyisocyanates having biuret groups as described e.g. in German Pat. No. 1,101,394; U.S. Pat. Nos. 3,124,605 and 3,201,372 and British Pat. No. 889,050, polyisocyanates prepared by telomerization reactions, e.g. as described in U.S. Pat. No. 3,654,106, polyisocyanates having ester groups, for example, those mentioned in British Pat. Nos. 965,474 and 1,072,956; U.S. Pat. No. 3,567,763 and German Pat. No. 1,231,688; reaction products of the above mentioned isocyanates with acetals as described in German Pat. No. 1,072,385 and polyisocyanates containing polymeric fatty acid groups according to U.S. Pat. No. 3,455,883.

The distillation residue still containing isocyanate groups from the commercial production of isocyanates may also be used, optionally dissolved in one or more of the above mentioned polyisocyanates. Any mixtures of the above mentioned polyisocyanates may also be used.

It is generally preferred to use readily available polyisocyanates such as 2,4- and 2,6-tolylene diisocyanate and any mixtures of these isomers ("TDI"), polyphenyl-polymethylene polyisocyanates which may be prepared by aniline formaldehyde condensation followed by phosgenation ("crude MDI") and polyisocyanates having carbodiimide groups, urethane groups, allophanate groups, isocyanurate groups, urea groups or biuret groups ("modified polyisocyanates").

The aqueous polyurethane dispersion and hydroxyl containing dispersing agent will be selected, as already mentioned above, according to the intended purpose of the polyurethane resins produced from the dispersions obtainable by the process according to the invention and desired modification or improvement in their mechanical properties. If, for example, a relatively hard, brittle polyurethane is required to be modified to render it more impact resistant, the aqueous dispersion of a highly elastic polyurethane would be used. In this way, it is possible not only to achieve a substantial reduction in the general brittleness of the end product but also to increase the elasticity of the outer zones which are particularly liable to be damaged by impact. In many cases, even the addition of less than 5% by weight of dispersed polyurethanes elastomer particles, based on the quantity of polyurethane end product, can result in the formation of a highly elastic, thin skin firmly attached to the polyurethane formed from the dispersing agent and polyisocyanate.

On the same principle, one could, of course, equally well modify a relatively soft polyurethane end product by means of a polyol dispersion prepared according to the invention which contains a relatively hard polyurethane dispersed therein. In this way, both hardness and tensile strength of the end product can be increased. In addition, it is possible, for example, to improve the stability to light of the products of the process by means of polyhydrazodicarbonamide particles or segments dispersed in the polyol. If, for example, the dispersion of a cross-linked polyurethane in a polyhydric alcohol is used as starting component for the polyisocyanate polyadditon process, the resistance of the product to solvents is improved, a result which is particularly important for products which are subsequently to be dry cleaned.

The special importance of the present invention lies in the fact that all the above mentioned improvements and modifications in the properties of polyurethane resins can be achieved with the use of the usual raw materials and with the usual, mostly standardized formulations, the only difference being that instead of using the conventional unmodified polyol in the polyisocyanate polyaddition process, the above mentioned products are used, which are prepared from polyurethane dispersions which are also commercially available. The modified polyol can generally be converted into a polyurethane resin by means of the usual standard reaction mixtures, independently of whether the polyurethane product to be produced is a foam, a homogeneous or porous coating, a polyurethane which is to be processed by a thermoplastic process or a lacquer coating.

The following Examples serve to explain the process according to the invention. Unless otherwise indicated, the figures given are parts by weight or percentages by weight.

The aqueous polyurethane dispersions used in the Examples were prepared as follows:

DISPERSION 1

Cationic, highly cross-linked polyurethane elastomer dispersion:

Reaction mixture: 63.0 parts by weight of a polyester of adipic acid, phthalic acid and diethylene glycol (OH number 60, acid number 1.7), 0.9 parts by weight of a hydroxymethylfunctional polysiloxane of the formula

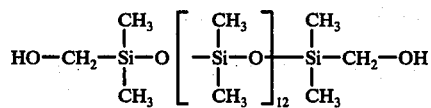

11.5 parts by weight of tolylene diisocyanate (65% 2,4- and 35% 2,6-isomer),
14.3 parts by weight of 1,6-hexamethylene diisocyanate,
2.1 parts by weight of N-methyl-diethanolamine,
6.1 parts by weight of diethylene triamine,
2.1 parts by weight of dimethylsulphate.

The solid content of the aqueous dispersion is 36%.

DISPERSION 2

28% aqueous, cationic, only slightly cross-linked polyurethane elastomer dispersion
Reaction mixture:
61.5 parts by weight of the same polyester as in Dispersion 1,
29.5 parts by weight of 4,4'-diphenylmethane diisocyanate,
6.2 parts by weight of N-methyl-diethanolamine,
1.6 parts by weight of dichlorodurene and
1.2 parts by weight of polyphosphoric acid (85%).

DISPERSION 3

35% Aqueous, anionic, cross-linked polyurethane elastomer dispersion
Reaction mixture:
69.1 Parts by weight of the polyester from Dispersion 1,
16.6 parts by weight of 1,6-hexamethylene diisocyanate,
4.2 parts by weight of the hydroxyfunctional polysiloxane from Dispersion 1 and
10.1 parts by weight of the diaminosulphonate of the formula

(hereinafter referred to as AAS salt).

DISPERSION 4

40% aqueous, anionic, linear dispersion
Reaction mixture:
82 parts by weight of a polyester of adipic acid, hexanediol-(1,6) and butanediol-(1,4) having a hydroxyl number of 63 and an acid number of 1.5,
15 parts by weight of 1,6-hexamethylenediisocyanate,
2.3 parts by weight of AAS salt and 0.7 parts by weight of 1,2-diaminopropane.

DISPERSION 5

50% aqueous, non-ionic, branched polyurethane elastomer dispersion
Reaction mixture:
70.5 parts by weight of the polyester from Dispersion 1,
5.5 parts by weight of the diol urea polyethylene oxide of the formula

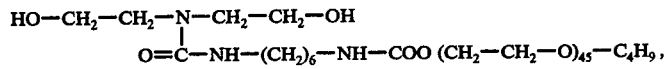

10.5 parts by weight of 1-isocyanato-3-isocyanatomethyl-3,5,5-trimethylcyclohexane,
8.5 parts by weight of 1,6-hexamethylene diisocyanate,
5.0 parts by weight of 1-amino-3-aminomethyl-3,5,5-trimethyl cyclohexane.

DISPERSION 6

Cationic, linear dispersion of a hard polyurethane
Reaction mixture:
5.12 parts by weight of polypropylene glycol (hydroxyl number 112),
23.23 parts by weight of diethylene glycol,
12.62 parts by weight of N-methyl-diethanolamine,
57.80 parts by weight of 2,4-tolylene diisocyanate and
1.23 parts by weight of dimethyl sulphate.

DISPERSION 7

45% aqueous, cationic, dispersion of a cross-linked, hard polyurethane
Reaction mixture:
8.44 parts by weight of polypropylene glycol (hydroxyl number 56),
25.23 parts by weight of diethylene glycol,
0.86 parts by weight of trimethylolpropane,
6.09 parts by weight of N-methyl-diethanolamine,
37.07 parts by weight of 2,4-tolylene diisocyanate,
21.45 parts by weight of 4,4'-diphenylmethane diisocyanate
0.86 part by weight of chloromethyl-methyl ether.

The dispersions were prepared according to the following general methods:

Method A (Dispersions 1 and 2)

An isocyanate prepolymer prepared from polyester, diisocyanate and optionally organopolysiloxane at 80° to 110° C is diluted with 80% by weight of acetone, based on the quantity of prepolymer, at 50° C. The chain lengthening and the quarternizing agents are then added at 30 minute intervals.

After completion of the quaternization reaction, water is gradually stirred in, optionally together with phosphoric acid, and the acetone is distilled off.

Method B (Dispersions 3 and 4)

The component containing hydroxyl groups and the diisocyanates are reacted together to form a non-ionic, hydrophobic prepolymer which is diluted with its own quantity by weight of acetone before the amino compounds, highly diluted with water, are added. The acetone is distilled off after 20 to 30 minutes boiling under reflux.

Method C (Dispersion 5)

A hydrophilic prepolymer is first prepared from the polyester, diolurea polyethylene oxide and diisocyanate mixture at 90° to 120° C, and dissolved in an equal quantity of acetone before a highly dilute aqueous solution of the diamine is added with vigorous stirring. The acetone is distilled off as soon as no free isocyanate groups can be detected.

Method D (Dispersions 6 and 7)

The diisocyanate is introduced into a stirrer apparatus equipped with reflux condenser and an approximately 40% solution in tetrahydrofuran of the polyhydric alcohols and alkanolamine is rapidly poured in with cooling at 60° to 70° C. The reaction mixture is then boiled under reflux for 3 to 5 hours, during which time the increase in viscosity is compensated by portionwise addition of tetrahydrofuran until a 20 to 30% solution in tetrahydrofuran is obtained.

The solution is quaternized by dropwise addition of a 10% THF solution of dimethylsulphate or chloromethylmethyl ether followed, after a reaction time of 30 minutes, by the addition of 2% by weight, based on the solid content, of 30 to 40% acetic acid. The reaction solution is then diluted with pure water until the given final concentration is obtained and the more readily volatile organic solvent is distilled off.

METHOD ACCORDING TO THE INVENTION

Examples of dispersions obtained according to the invention by replacement of the water as dispersing agent by polyol are summarized in the following Table 1.

TABLE 1

| | | Aqueous dispersion | | | |
| Ex. No. | Polyol (% by weight) | Solid content (% by weight) | Dispersion number | Method | Viscosity (cP/25%) |
| --- | --- | --- | --- | --- | --- |
| 1 | 92.5 I | 7.5 | 4 | a | 2,170 |
| 2 | 90.0 I | 10.0 | 5 | b | 1,550 |
| 3 | 85.0 II | 15 | 4 | c | 60 |
| 4 | 60.0 II | 40 | 4 | c | 980 |
| 5 | 60.0 III | 40 | 1 | c | 1,270 |
| 6 | 85.0 IV | 15 | 3 | b | 1,350 |
| 7 | 85.0 IV | 15 | 4 | b | 1,760 |
| 8 | 60.0 II | 40 | 2 | c | 1,080 |
| 9 | 80.0 V | 20 | 6 | a | 1,910 |
| 10 | 65.0 I | 35 | 7 | c | 3,470 |
| 11 | 75.0 V | 25 | 7 | a | 1,200 |

The dispersing agents indicated in Column 2 of Table 1 have the following composition:

Polyol I: A polyether of propylene oxide and ethylene oxide started on trimethylolpropane and having a hydroxyl number of 34 and containing about 80% of primary hydroxyl groups.
Polyol II: Monoethylene glycol
Polyol III: Tetraethylene glycol
Polyol IV: A polyethylene glycol with hydroxyl number 550 started on trimethylolpropane.
Polyol V: a polyether of propylene oxide and ethylene oxide started on glycerol and having a hydroxyl number of 56 and containing about 50% of primary hydroxyl groups.

The following general procedure was adopted when water was replaced by polyols I to V as dispersing agents.

METHOD A

The aqueous dispersion is slowly stirred into the polyol which has been heated to 60°-70° C and at the same time water is distilled off at reduced pressure (pressure is lowered from about 100 mm to 3–20 mm). The temperature may be raised to about 100° C towards the end of distillation.

METHOD B

The polyol is heated to 50°-80° C. the aqueous dispersion is slowly stirred in and finally water is distilled off at reduced pressure until the temperaure reaches 100° C (the pressure is again lowered from about 100 mm to 3-20 mm).

METHOD C

The aqueous dispersion and polyol are combined at room temperature. A vacuum is then applied and water is distilled off with gradual rise of temperature to 110° C.

The following Examples illustrate the use of the dispersions prepared according to the invention as starting components for the production of polyurethane foams.

EXAMPLE 12

A mixture of 100 parts by weight of the 10% non-ionic, hydrophilic, elastomer polyurethane dispersion (hydroxyl number 31.5) from Example 2,
3.0 parts by weight of water,
0.03 parts by weight of triethylene diamine,
0.5 parts by weight of 2-dimethylamino-ethanol,
0.5 parts by weight of a commercial polysiloxane foam stabilizer (OS 15 of Bayer AG) and
0.1 part by weight of tin-(II) octoate is reacted with 36.6 parts by weight of diisocyanate T 80 (tolylene diisocyanate, ratio of isomers 2,4:2,6 = 80:20). A creamy reaction mixture is obtained after 12 seconds. It has a rise time of 115 seconds.

The resulting foam is found to have the following mechanical properties:

| Gross density according to DIN | 53 420 | 34 kg/m$^3$ |
|---|---|---|
| Tensile strength | 53 571 | 150 KPa |
| Elongation at break | 53 571 | 150 % |
| Compression resistance | 53 577 | 5.8 KPa |

EXAMPLE 13

A mixture of 100 parts by weight of the dispersion described in Example 12,
5.0 parts by weight of water,
0.1 parts by weight of triethylene diamine,
0.2 parts by weight of 2-dimethylaminoethanol,
1.0 parts by weight of polysiloxane foam stabilizer (OS 25 of Bayer AG) and
0.15 parts by weight of tin-(II) octoate is vigorously stirred together with 59.7 parts by weight of diisocyanate T 80. A creamy reaction mixture having a rise time of 145 seconds is obtained after 9 seconds.

The resulting foam is found to have the following mechanical properties:

| Gross density according to DIN | 53 420 | 21 kg/m$^3$ |
|---|---|---|
| Tensile strength | " | 53 571 | 140 KPa |
| Elongation at break | " | 53 571 | 160% |
| Compression resistance | " | 53 577 | 3.6 KPa |

EXAMPLE 14

A mixture of 100 parts by weight of the dispersion used in Example 12,
2.5 parts by weight of water,
0.16 parts by weight of triethylene diamine,
1.5 parts by weight of a commercial polysiloxane stabilizer manufactured by Goldschmidt (B 2909),
1.0 part by weight of diethanolamine and
2.0 parts by weight of trichlorotriethylphosphate is vigorously stirred together with 31.3 parts by weight of diisocyanate T 80. A creamy reaction mixture which has a rise time of 150 seconds is formed after 10 seconds.

The foam obtained is found to have the following mechanical properties:

| Gross density according to DIN | 53 420 | 39.5 kg/m$^3$ |
|---|---|---|
| Tensile strength | " | 53 571 | 100 KPa |
| Elongation at break | " | 53 571 | 125% |
| Compression resistance | " | 53 577 | 2.2 KPa |

EXAMPLE 15

A mixture of 100 parts by weight of the 10% dispersion according to Example 10 (diluted with polyol V)
2.5 parts by weight of water,
0.8 parts by weight of 2-dimethylaminoethanol,
0.8 parts by weight of a commercial polysiloxane stabilizer manufactured by Goldschmidt (B 3842)
2.0 parts by weight of trichloroethylphosphate is vigorously stirred together with 29.4 parts by weight of diisocyanate T 80. A creamy reaction mixture which has a rise time of 175 seconds is obtained after 11 seconds.

The resulting foam is found to have the following mechanical properties:

| Gross density according to DIN | 53 420 | 40 kg/m$^3$ |
|---|---|---|
| Tensile strength | " | 53 571 | 95 KPa |
| Elongation at break | " | 53 571 | 120 % |
| Compression resistance | " | 53 577 | 3.1 KPa |

EXAMPLE 16

A mixture of 100 parts by weight of the 7.5% anionic elastomer polyurethane dispersion (hydroxyl number = 32.4) according to Example 1,
5.0 parts by weight of water,
0.1 parts by weight of triethylene diamine,
1.5 parts by weight of polysiloxane stabilizer (OS 15 of Bayer AG) and
0.3 parts by weight of tin-(II) octoate is vigorously stirred together with 56.9 parts by weight of diisocyanate T 80. A creamy reaction mixture which has a rise time of 80 seconds is formed after 9 seconds.

The resulting foam is found to have the following mechanical properties:

| Gross density according to DIN | 53 420 | 23 kg/m$^3$ |
|---|---|---|
| Tensile strength | " | 53 571 | 140 KPa |
| Elongation at break | " | 53 571 | 145 % |
| Compression resistance | " | 53 577 | 3.8 KPa |

EXAMPLE 17

A mixture of 100 parts by weight of the 7.5% anionic elastomer polyurethane dispersion used in the previous example,
3.0 parts by weight of water,
0.15 parts by weight of triethylenediamine,
0.8 parts by weight of polysiloxane stabilizer (OS 50 of Bayer AG) and
0.25 parts by weight of tin(II) octoate is vigorously stirred together with 36.9 parts by weight of diisocyanate T 80. A creamy reaction mixture which has a rise time of 90 seconds is formed after 8 seconds.

The foam obtained is found to have the following mechanical properties:

| | | |
|---|---|---|
| Gross density according to DIN | 53 420 | 35 kg/m$^3$ |
| Tensile strength " | 53 571 | 150 KPa |
| Elongation at break " | 53 571 | 140 % |
| Compression resistance " | 53 577 | 6.0 KPa |

EXAMPLE 18

A mixture of
25 parts by weight of the dispersion from Example 10,
75 parts by weight of a polyether prepared from 10% of ethylene oxide and 90% of propylene oxide and started on trimethylolpropane (hydroxyl number 42),
13.2 parts by weight of an aqueous polyvinyl chloride dispersion (64.6% solids content),
0.3 part by weight of 2-dimethylamino-ethanol,
0.1 part by weight of triethanolamine,
0.6 part by weight of polysiloxane stabilizer (OS 20 of Bayer AG) and
0.2 part by weight of tin-(II) octoate is vigorously stirred together with
59.2 parts by weight of T 80. A creamy reaction mixture which has a rise time of 85 seconds is formed after 15 seconds.

The foam obtained is found to have the following mechanical properties:

| | | |
|---|---|---|
| Gross density according to DIN | 53 420 | 23 kg/m$^3$ |
| Tensile strength " | 53 571 | 100 KPa |
| Elongation at break " | 53 571 | 95% |
| Compression resistance " | 53 577 | 3.9 KPa |

EXAMPLE 19

A mixture of
100 parts by weight of the polyether mixture described in Example 18 (25:75),
4.5 parts by weight of a commercial ABS polymer dispersion (solids content 33%),
0.8 part by weight of 2-dimethylaminoethanol,
0.3 part by weight of polysiloxane stabilizer (OS 20 of Bayer AG) and
0.1 part by weight of tin-(II) octoate is vigorously stirred together with
38.2 parts by weight of T 80. A creamy reaction mixture which has a rise time of 112 seconds is formed after 14 seconds.

The foam obtained is found to have the following mechanical properties:

| | | |
|---|---|---|
| Gross density according to DIN | 53 420 | 35 kg/m$^3$ |
| Tensile strength " | 53 571 | 140 KPa |
| Elongation at break " | 53 571 | 160 % |
| Compression resistance " | 53 577 | 4.8 KPa |

EXAMPLE 20

A mixture of
100 parts by weight of the polyether mixture (25:75) described in Example 18,
8.3 parts by weight of an aqueous copolymer dispersion of styrene and acrylonitrile (solids content 40%),
0.1 part by weight of triethylene diamine,
0.3 part by weight of 2-dimethylaminoethanol,
0.6 part by weight of polysiloxane stabilizer (OS 20) and
0.2 part by weight of tin-(II) octoate is vigorously stirred together with
59.2 parts by weight of T 80. A creamy reaction mixture is formed after 14 seconds. It has a rise time of 97 seconds.

The foam obtained is found to have the following mechanical properties:

| | | |
|---|---|---|
| Gross density according to DIN | 53 420 | 22 kg/m$^3$ |
| Tensile strength " | 53 571 | 110 KPa |
| Elongation at break " | 53 571 | 120 % |
| Compression resistance " | 53 577 | 3.9 KPa |

What is claimed is:

1. In a process for the preparation of a polyurethane resin comprising reacting a polyisocyanate with an active hydrogen containing material, the improvement wherein at least a portion of said active hydrogen containing material is a stable, relatively low viscosity dispersion of a polyisocyanate-polyaddition product prepared by a process comprising mixing an aqueous dispersion of a polyisocyanate-polyaddition product with a compound which has at least two hydroxyl groups and a boiling point above 100° C and at least partially distilling off the water.

2. The process of claim 1, wherein said polyisocyanate-polyaddition product is selected from the group consisting of polyurethane, polyurea and polyhydrazodicarbonamide.

3. The process of claim 2, wherein said polyurethane resin is prepared in the presence of a blowing agent.

4. The process of claim 3, characterized in that ionic dispersions of polyurethanes, polyureas or polyhydrazodicarbonamides are used.

5. The process of claim 3, wherein prior to foaming, an aqueous polymer latex is added to the reaction mixture.

* * * * *